(12) United States Patent
Randall et al.

(10) Patent No.: US 10,515,465 B2
(45) Date of Patent: Dec. 24, 2019

(54) DIGITAL PAINT GENERATION, CONTAINER REPRESENTATION, AND HIERARCHICAL STORAGE

(71) Applicant: Adobe Inc., San Jose, CA (US)

(72) Inventors: Mark M. Randall, Folsom, CA (US); Abraham Moshe Muchnick, Woodmere, NY (US); Benoit Ambry, Fair Oaks, CA (US); Kushith C. Amerasinghe Godagamage, San Francisco, CA (US); Jean-Sylvere Charles Simonet, Rockville, MD (US)

(73) Assignee: Adobe Inc., San Jose, CA (US)

( * ) Notice: Subject to any disclaimer, the term of this patent is extended or adjusted under 35 U.S.C. 154(b) by 3 days.

(21) Appl. No.: 15/701,303

(22) Filed: Sep. 11, 2017

(65) Prior Publication Data

US 2019/0080486 A1     Mar. 14, 2019

(51) Int. Cl.
| | | |
|---|---|---|
| G09G 5/02 | (2006.01) | |
| G06T 11/00 | (2006.01) | |
| G06F 3/0481 | (2013.01) | |
| G06F 3/0484 | (2013.01) | |
| G06F 3/0482 | (2013.01) | |

(52) U.S. Cl.
CPC .......... *G06T 11/001* (2013.01); *G06F 3/0482* (2013.01); *G06F 3/04817* (2013.01); *G06F 3/04845* (2013.01); *G06F 3/04847* (2013.01)

(58) Field of Classification Search
CPC .................................................... G06T 11/001
See application file for complete search history.

(56) References Cited

U.S. PATENT DOCUMENTS

| | | |
|---|---|---|
| 5,409,379 A | 4/1995 | Montag et al. |
| 5,432,896 A * | 7/1995 | Hwong ................. G06T 11/001 345/592 |
| 9,240,063 B1 | 1/2016 | Tremblay et al. |
| 9,734,635 B1 | 8/2017 | Gorumkonda |
| 2009/0085880 A1 | 4/2009 | Vitale et al. |
| 2009/0222469 A1* | 9/2009 | Maillot ................ G06T 11/001 |
| 2009/0262130 A1 | 10/2009 | Ramirez |
| 2011/0271216 A1* | 11/2011 | Wilson ................. G06F 3/0481 715/765 |
| 2011/0274348 A1 | 11/2011 | Oicherman et al. |
| 2014/0132617 A1 | 5/2014 | Bhattacharyay et al. |

(Continued)

OTHER PUBLICATIONS

"First Action Interview Office Action", U.S. Appl. No. 15/701,330, dated Mar. 7, 2019, 62 pages.

(Continued)

*Primary Examiner* — Charles Tseng
(74) *Attorney, Agent, or Firm* — SBMC

(57) ABSTRACT

Digital paint generation techniques and systems are described that are configured to bridge a perceived divide between functionality made available to users to create digital content and the users' understanding as to how this functionality is to be used. A variety of techniques and systems are described that support this expansion. In one example, container representation and hierarchical storage such that previously generated digital paints and combinations of those paints may be used to generate a new digital paint, which is not possible using conventional techniques.

20 Claims, 15 Drawing Sheets
(9 of 15 Drawing Sheet(s) Filed in Color)

(56) References Cited

U.S. PATENT DOCUMENTS

| | | | |
|---|---|---|---|
| 2014/0132619 A1* | 5/2014 | Landsberger | G06T 11/001 345/589 |
| 2014/0153825 A1 | 6/2014 | Jones et al. | |
| 2014/0267223 A1* | 9/2014 | Sumner | G06T 19/20 345/419 |
| 2019/0079661 A1 | 3/2019 | Randall et al. | |
| 2019/0080485 A1 | 3/2019 | Randall et al. | |
| 2019/0080487 A1 | 3/2019 | Randall et al. | |
| 2019/0096096 A1 | 3/2019 | Randall et al. | |

OTHER PUBLICATIONS

"Pre-Interview First Office Action", U.S. Appl. No. 15/701,029, dated Feb. 4, 2019, 65 pages.

"Pre-Interview First Office Action", U.S. Appl. No. 15/701,182, dated Feb. 4, 2019, 54 pages.

"Pre-Interview First Office Action", U.S. Appl. No. 15/701,330, dated Jan. 22, 2019, 62 pages.

"Pre-Interview First Office Action", U.S. Appl. No. 15/716,311, dated Feb. 19, 2019, 64 pages.

"Final Office Action", U.S. Appl. No. 15/701,330, May 3, 2019, 21 pages.

"First Action Interview Office Action", U.S. Appl. No. 15/701,182, Mar. 20, 2019, 54 pages.

"First Action Interview Office Action", U.S. Appl. No. 15/716,311, Mar. 29, 2019, 58 pages.

"First Action Interview Office Action", U.S. Appl. No. 15/701,029, Mar. 20, 2019, 65 pages.

"Notice of Allowance", U.S. Appl. No. 15/701,182, Jul. 12, 2019, 10 pages.

"Notice of Allowance", U.S. Appl. No. 15/701,330, Aug. 13, 2019, 11 pages.

"Notice of Allowance", U.S. Appl. No. 15/716,311, Jul. 15, 2019, 8 pages.

"Notice of Allowance", U.S. Appl. No. 15/701,029, Jun. 27, 2019, 9 pages.

"Supplemental Notice of Allowance", U.S. Appl. No. 15/701,029, Sep. 9, 2019, 2 pages.

* cited by examiner

US 10,515,465 B2

DIGITAL PAINT GENERATION, CONTAINER REPRESENTATION, AND HIERARCHICAL STORAGE

BACKGROUND

The ways in which users are able to create digital images through interaction with computing devices continues to expand. However, the techniques used to select and generate colors have not kept pace with this expansion. For example, conventional techniques are limited to selecting a particular hue for a color, which limits functionality that otherwise may be made available to users. Additionally, these conventional techniques typically rely on complex user interface interactions and thus require expertise that make these systems unapproachable by untrained and novice users.

Further, conventional techniques store these colors separately as atomic units and as a result are not able to leverage multiple colors as part of color selection. A user, for instance, may interact with a conventional color picker. The color picker is used to select a fill or stroke color by choosing from a color field and spectrum, which defines the color numerically or by clicking a swatch. A swatch is a named color that is formed from a color, tint, gradient, and/or pattern used. Swatches are typically located and defined through a swatches panel and swatch library that are output in a user interface.

The color picker also includes an option to name and save a selected color as a named color, i.e., a swatch. Thus, the named color is based on values defined through user interaction used to define that color, alone. Although, a previously named color (e.g., as a swatch) may be used as a basis to form a newly named color, this interaction is limited to changing color values previously defined for the previously named color, alone. Thus, conventional color selection systems are not able to employ more than one previously named color as part of color selection, which is limiting and inefficient. Further, conventional techniques are also limited to conventional colors for rendering in a user interface and therefore do not expand from these colors. This limits functionality that otherwise may be made available to users of these conventional systems and techniques.

SUMMARY

Digital paint generation, container representation, and hierarchical storage techniques and systems are described that are configured to generate digital paint in an efficient and intuitive manner These techniques and systems overcome limitations of conventional systems to expand how digital paint is able to be represented in a user interface through use of physical digital paint properties along with color digital paint properties. This supports the creation of digital images having characteristics that are not possible using conventional systems that are limited to conventional uses of color.

Container and hierarchical storage techniques and systems are also supported in which previously generated digital paints and corresponding digital paint properties may be used as part of generating a new digital paint. A container representation, for instance, may include a collection of digital paint properties (e.g., color and/or physical) and corresponding values used to generate a previous digital paint. The container representation may be employed along with other digital paint properties which are or are not included as part of that representation, other container representations, and so on to generate a new digital paint. This relationship of the container representations, one to another, defines a hierarchy in which a first container representation and corresponding digital paint is used to define a second container representation and corresponding digital paint.

The hierarchy may also be leveraged to expand digital paint generation functionality. For example, changes made to the first container representation may be automatically applied by the image processing system to the second container representation, i.e., is generated at least in part based on the first container representation as described above. As a result, functionality available to users is expanded and efficiency increased by not forcing the user to "start over again from scratch" or by not limiting the user to changing numerical values of a previously named color, alone, as required by conventional color selection systems.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawings will be provided by the Office upon request and payment of the necessary fee.

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
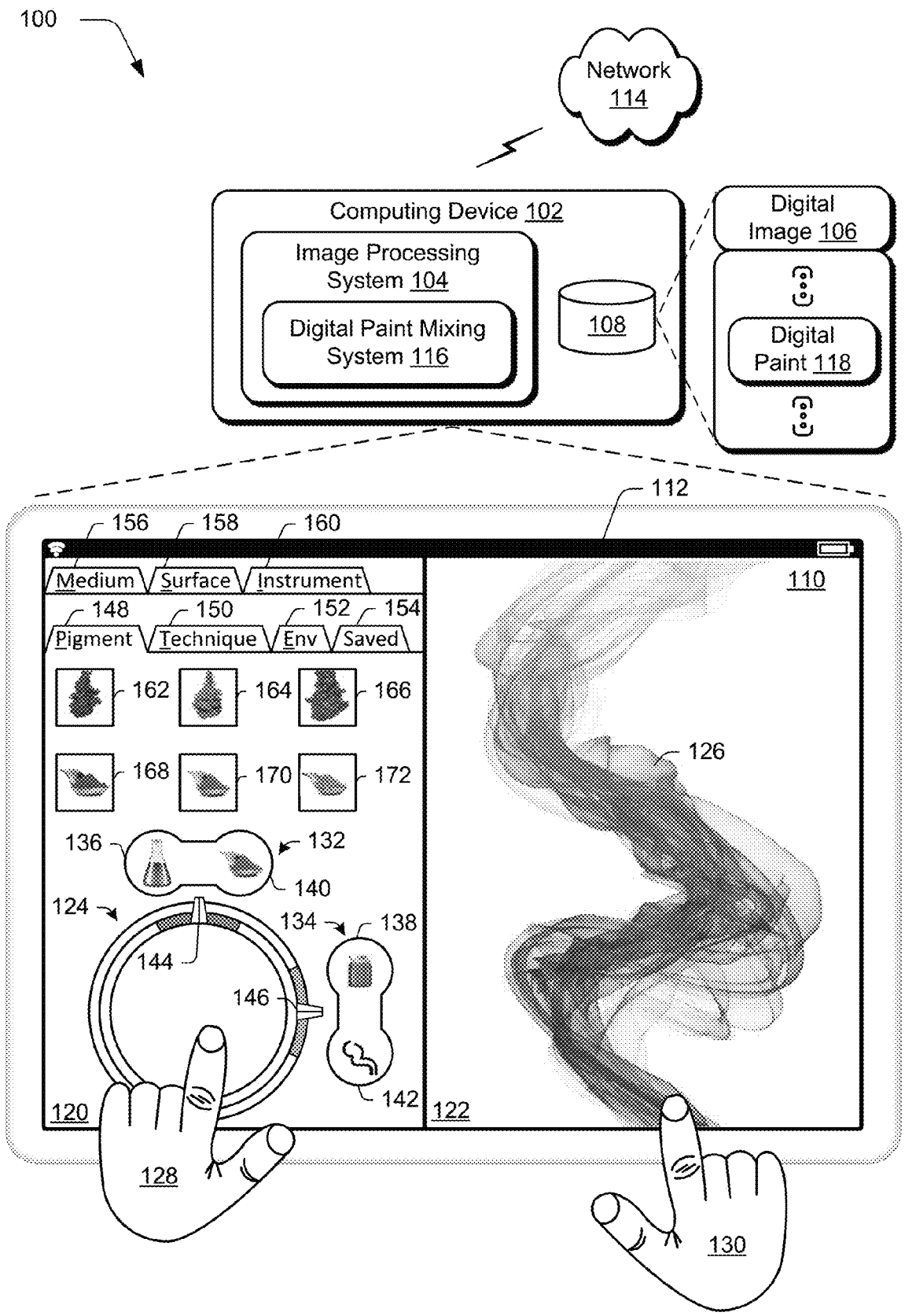
FIG. 1 is an illustration of an environment in an example implementation that is operable to employ techniques described herein.

Digital paint generation techniques and systems are described that support color and physical digital paint properties and interaction of these properties with each other as part of generating digital paint. Additionally, these techniques and system support container representation and hierarchical storage such that previously generated digital paints and combinations of those paints may be used to generate a new digital paint, which is not possible using conventional techniques. As a result, digital paint generated using these techniques may expand beyond conventional techniques used to pick a color, solely, to now include dynamic and complex interactions, e.g., as part of an animation of the digital paint. Further, these techniques support creation of types of art as part of the digital images that is not possible using conventional techniques based solely on color.

In one example, a digital paint generation technique supports user interaction to define digital color properties to be used to generate digital paint. This includes color digital paint properties that define a pigment (e.g., hue) to be used to generate the digital paint, e.g., red, green, blue, etc. This technique, for instance, may be used to mix two or more different pigments to generate a desired hue of digital paint, e.g., purple, indigo, chartreuse, and so on. This also includes physical digital paint properties, such as medium (e.g., chalk, ink), surface (e.g., paper, metal), instrument used to apply the medium (e.g., brush, pencil), technique used by the instrument to apply the medium (e.g., layered, blending), environment in which the medium and surface as disposed (e.g., lighting conditions), and so forth. In this way, user interaction supported by this technique may expand beyond conventional color selection techniques described above to support combinations of digital paint properties that are not possible in conventional systems.

The combination and adjustment of color and physical digital paint properties may be used by the image processing system to aid a user in understanding effects of color and physical digital paint property interaction. A color digital paint property, for instance, may represent a certain hue of red, e.g., R210, G10, B30. However, the same hue combined with a physical digital paint property may cause the hue to have the specularity of a heavy oil-based paint. This hue and physical digital paint property combination would be considered, when viewed by a user, to have a different color even though it is based on the same RGB value. Therefore, the user may view how combinations of color and physical digital paint properties interact with each other as part of digital paint generation. This is not possible using conventional color selection systems that are based solely on color.

Further, the image processing system may support container representation functionality to store and support interaction of generated digital paints with additional digital paint properties and even other digital paints. A user, for instance, may interact with the image processing system as described above to generate digital paint having desired characteristics, e.g., based on color and/or physical digital paint properties. The user may then initiate an input to store digital paint, which may be represented in the user interface as a container representation.

The container representation is then user selectable for use in generating subsequent digital paint. The image processing system, for instance, may employ digital paint properties (e.g., color and/or physical) defined for digital paint of the container representation with additional digital paint properties and even additional container representations in order to generate subsequent digital paint. This process may continue to support a hierarchical relationship of container representations of digital paints in which digital paints (and associated color and physical digital paint properties) contribute to generate additional digital paints. In this way, the container representation may support efficient user interaction with the image processing system without requiring the user to "start from scratch."

Additionally, the container representations may support a variety of additional interactions, and thus provide increased functionality as part of the image processing system. In one example, the container representation is user selectable to change digital paint properties used to generate the digital paint of the container representation. This may be used to both generate new digital paint for that container as well as subsequent digital paint. An effect of the changes through interaction with a mix control, for instance, may be displayed for digital paint that corresponds to (e.g., "contained in") the container representation and/or directly for subsequent digital paint that is generated based on the digital paint. Thus, container representations may be used to support a hierarchy of digital paints and interactions, examples of which are further described in a corresponding section that follows.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ digital paint generation techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 15.

The computing device 102 is illustrated as including an image processing system 104. The image processing system 104 is implemented at least partially in hardware of the computing device 102 to process and transform a digital image 106, which is illustrated as maintained in a storage device 108 of the computing device 102. Such processing includes creation of the digital image 106, modification of the digital image 106, and rendering of the digital image 106 in a user interface 110 for output, e.g., by a display device 112. Although illustrated as implemented locally at the computing device 102, functionality of the image processing system 104 may also be implemented as whole or part via functionality available via the network 114, such as part of a web service or "in the cloud."

An example of functionality incorporated by the image processing system 104 is represented as a digital paint mixing system 116. The digital paint mixing system 116 is implemented in functionality of the computing device 102 (e.g., a processing system and computer-readable storage media) to generate digital paint 118 for rendering in the user interface 110 of the display device 112 and/or inclusion as part of the digital image 106. The digital paint 118 is also illustrated as stored in the storage device 108.

The digital paint mixing system 116 in this example is configured to support output of the user interface 110 as having a paint generation control portion 120 and a paint generation output portion 122. The paint generation control portion 120 is configured to support user interaction to support selection of digital paint properties to be used to generate digital paint as well as amounts of the selected digital paint properties as part of generating the digital paint. The illustrated example of this is a mix control 124. The paint generation output portion 122 is configured to display feedback 126 as a rendering of the digital paint 118 as generated based on user interaction with the paint generation control portion 120.

In one example, a first hand 128 of a user interacts with the mix control 124 to specify amount of the digital paint properties that serve as a basis to generate the digital paint 118. In response, the digital paint mixing system 116 generates and outputs the digital paint 118 in real time to follow another user input received via interaction with a second hand 130 of the user as feedback 126. The second hand 130, for instance, may draw a freeform line in the paint generation output portion 122 of the user interface 110. The digital paint mixing system 116, based on detection of the other input via touchscreen functionality, then generates the digital paint 118 in real time (e.g., through use of pixel shaders) to follow the user input of the second hand 140 as the feedback 126, e.g., in real time. In this way, the digital paint mixing system 116 provides real time feedback 126 regarding an effect of amounts of digital paint properties on generation of the digital paint 118 displayed in the user interface 110.

The mix control 124 may be configured in a variety of ways. In the illustrated example, the mix control 124 is configured to support multi-axis control through use of a first axis 132 and a second axis 134. The first and second axes 132, 134 each include respective first ends 136, 138 and second ends 140, 142. The first and second ends 136, 138, 140, 142 correspond to respective digital paint properties that are user selected. Interaction with the mix control 124 is then used to control the amounts of these digital paint properties that are used to generate the digital paint 118, e.g., as gradations between the options at respective ends of the first and second axes 132, 134.

A user input, for instance, may be detected as initiated by the first hand 128 of the user to move in X and/or Y directions. In this instance, movement in the X direction is used to control amounts of digital paint properties at first and second ends 136, 140 of the first axis 132 of the mix control 124. Likewise, movement in the Y direction is used to control amounts of digital paint properties at first and second ends 138, 142 of the second axis 134 of the mix control 124.

In one example, the input is implemented as a single multi-axis user input to specify an inverse relationship between digital paint properties at the first and second ends 136, 138, 140, 142 of the respective first and second axes 132, 134. Accordingly, an increase in an amount at one end of the axis causes a corresponding decrease in an amount at the other end of the axis through interaction with the mix control 124 through a plurality of gradations. Indications 144, 146 may also be included as part of the mix control 124 to indicate these relative amounts of digital paint properties to be used to generate the digital paint 118 of the respective first and second axes 132, 134.

The mix control 124 may be used to specify a variety of different amounts and types of digital paint properties. Examples of digital paint properties include color digital paint properties, referred to as pigments 148. Color digital paint properties, as pigments 138, describe hues of colors. Hues are an attribute of color by virtue of which it is discernible as red, green, blue, and so on, which is dependent on its dominant wavelength, and independent of intensity or lightness. A user selection, for instance, may be received through interaction with the user interface 110 to select from a variety of pigments 162, 164, 166, 168, 170, 172 options for use at particular ends of the mix control 124. These selections may then be used through interaction with the mix control 124 to generate digital paint 118 having a desired hue.

The digital paint properties may also include physical digital paint properties. Examples of physical digital paint properties include medium 156 (e.g., chalk, ink), surface 158 (e.g., paper, metal), instrument 160 used to apply the medium (e.g., brush, pencil), technique 150 used by the instrument to apply the medium (e.g., layered, blending), 152 environment in which the medium and surface as disposed (e.g., lighting conditions, meta-conditions such as particle gravity and repulsion), and so forth. Further examples of physical digital paint properties are described in relation to FIG. 9. The paint generation control portion 120 of the user interface also includes an option for selection of saved 154 instances of digital paint 118, e.g., as "containers."

In this way, a user may select which digital paint properties are to be used as a basis to generate the digital paint 118, control amounts of the digital paint properties used in the generation through interaction with the mix control 124, and output a result of this generation as feedback 126 in the user interface 110, e.g., in real time. As a result, the digital paint mixing system 116 supports efficient and intuitive techniques to indicate an effect of interaction of these digital paint properties with each other as part of generating the digital paint 118. This digital paint 118 may then be leveraged in a variety of ways, such as to incorporate the digital paint 118 as part of a digital image 106 configured to be rendered by the display device 112. Further discussion of operation of the digital paint mixing system 116 is described in the following sections.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Digital Paint Property Selection and Use

Figure 2:
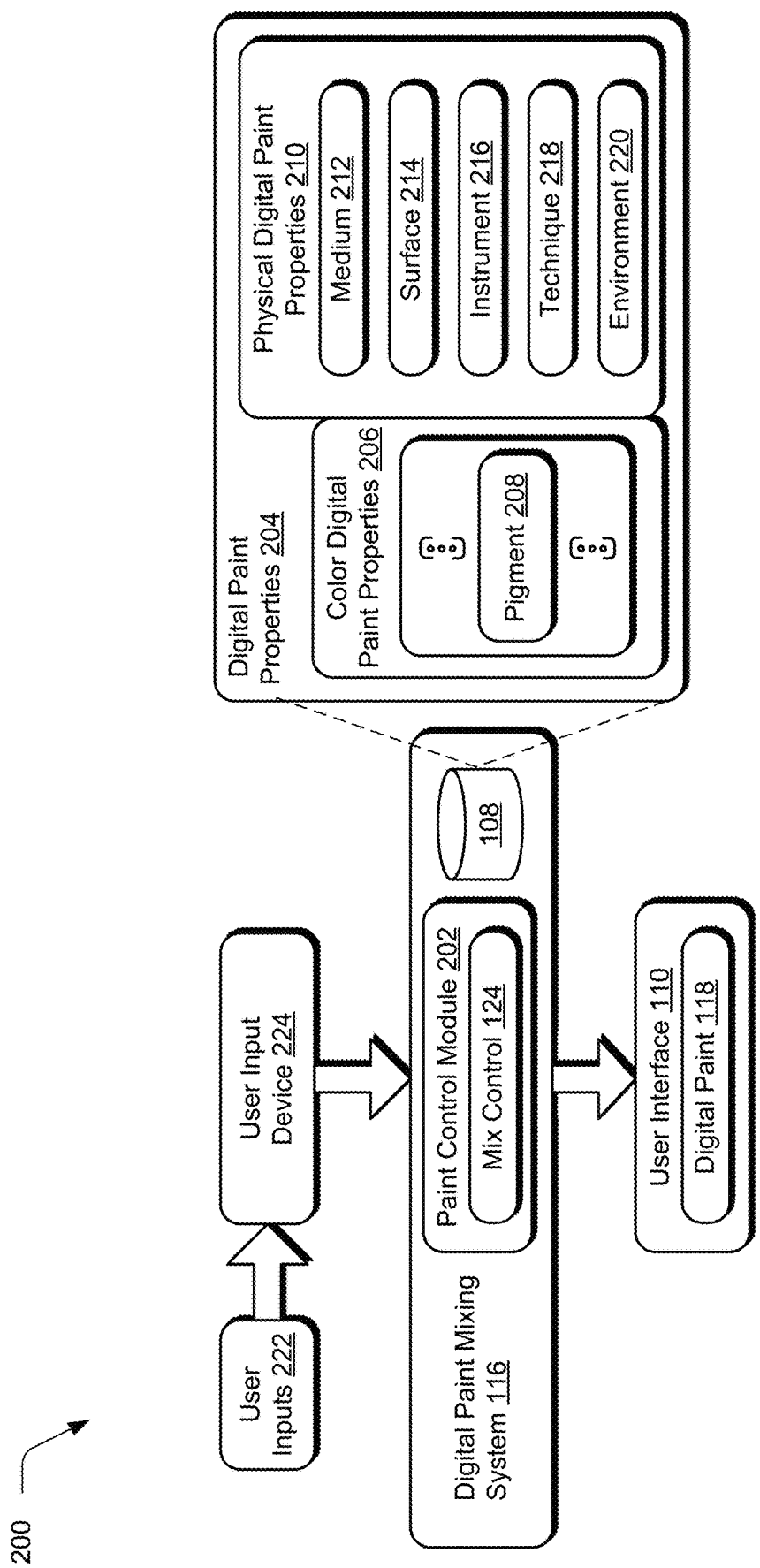
FIG. 2 depicts an example system showing operation of a digital paint mixing system of FIG. 1 in greater detail.
Figure 3:
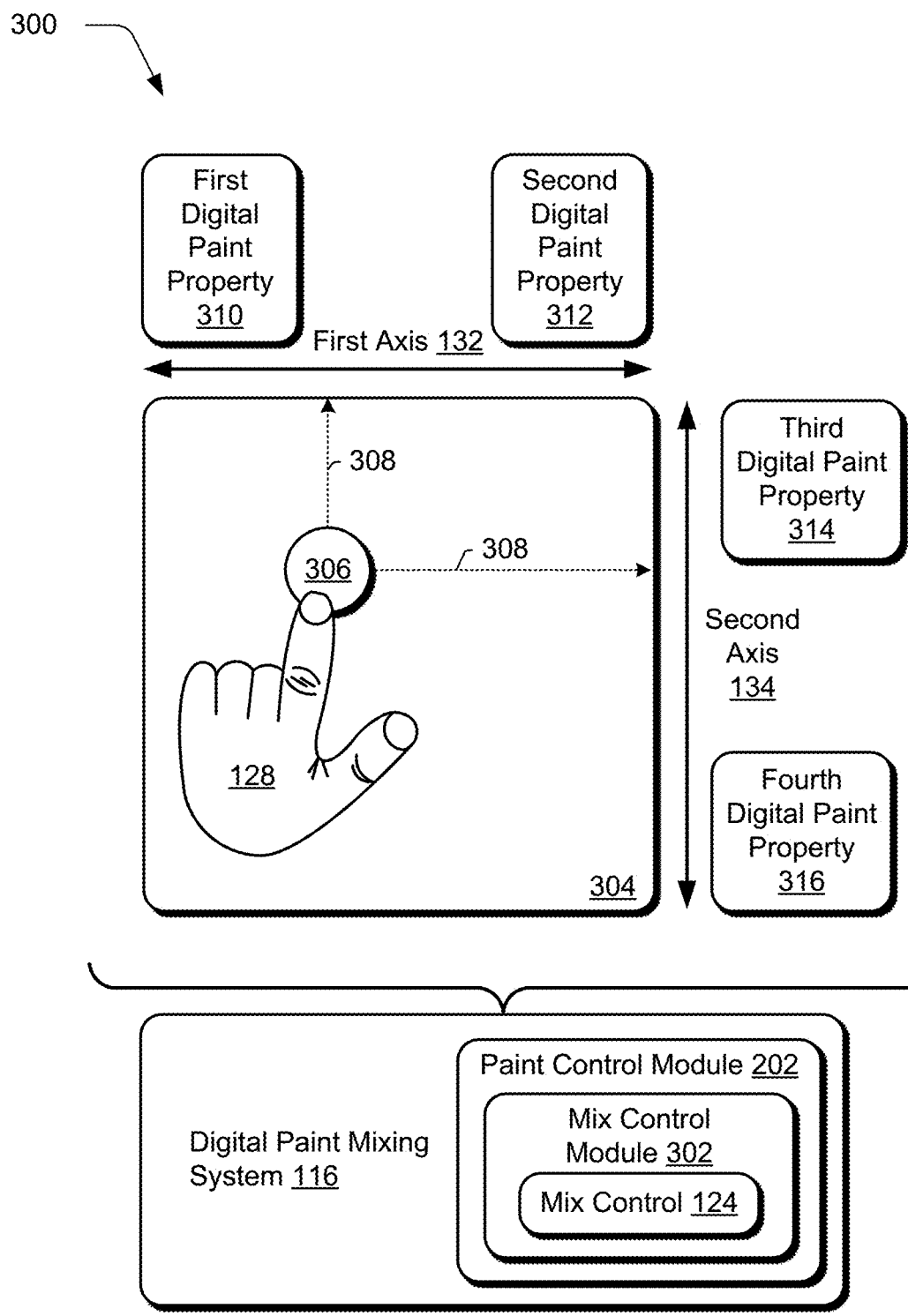
FIG. 3 depicts an example implementation of a mix control of FIG. 2 as a multi-axis control.
Figure 4:
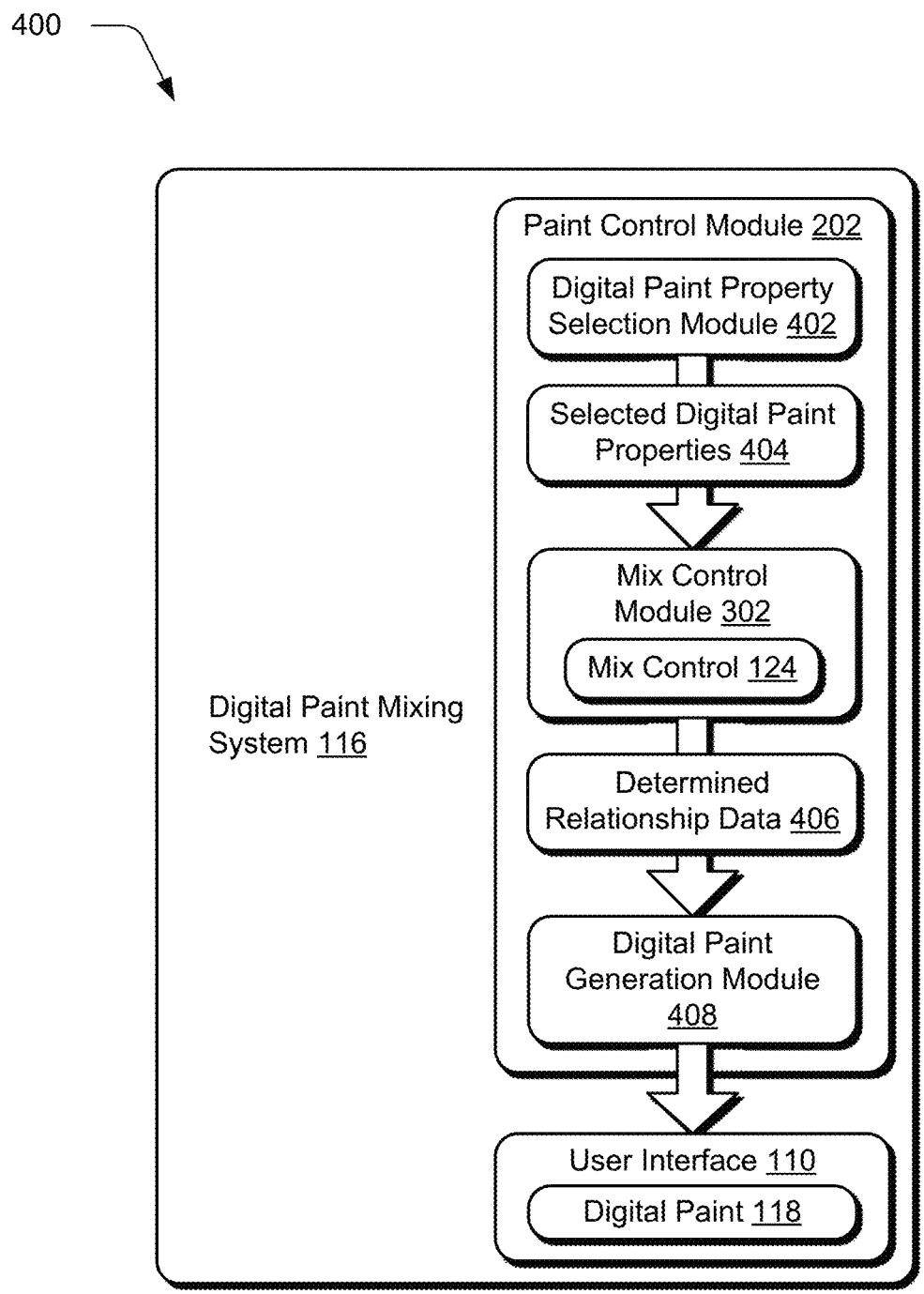
FIG. 4 depicts an example implementation showing operation of a paint control module and mix control of FIG. 2 in greater detail.
Figure 5:
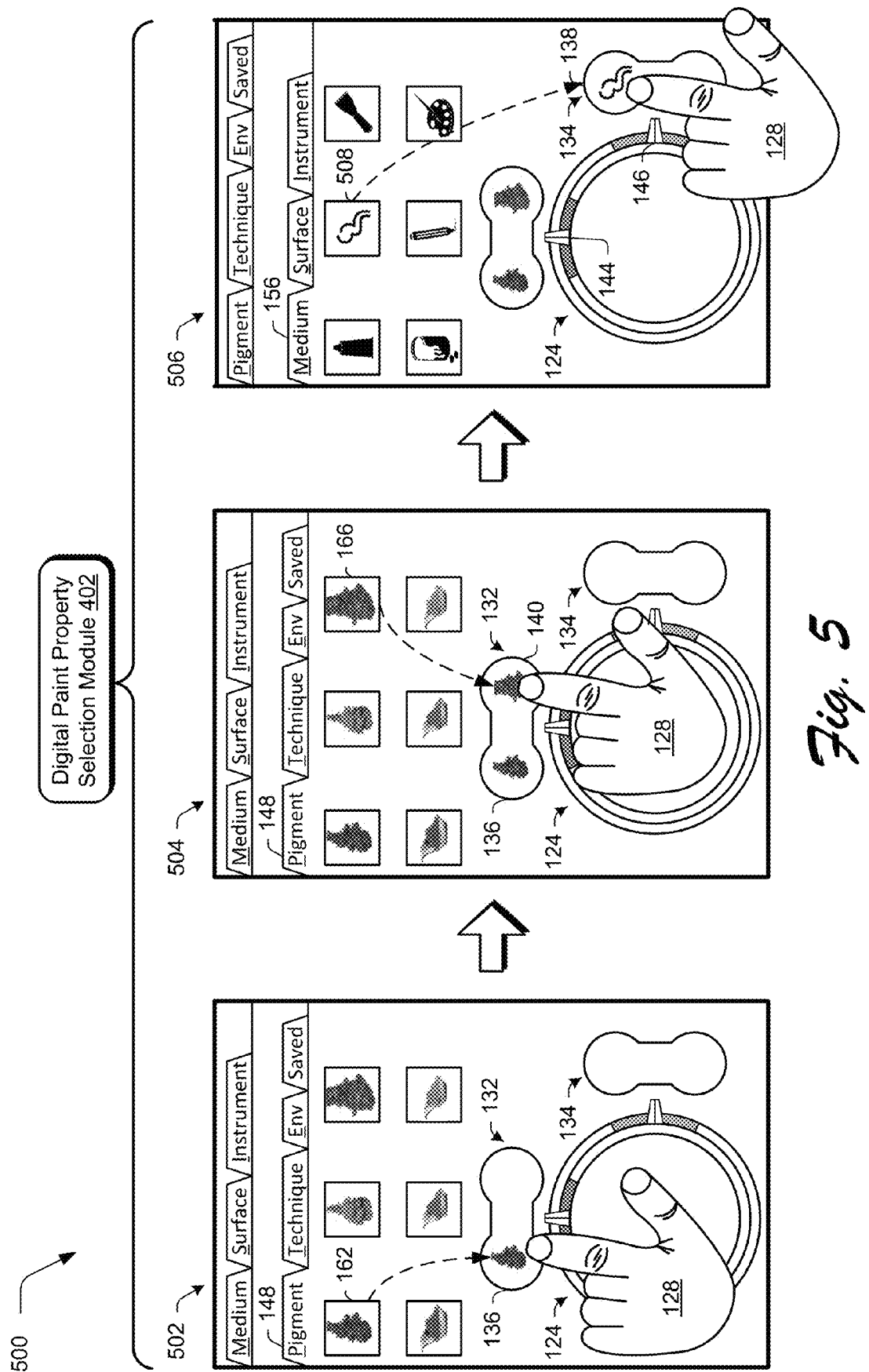
FIG. 5 depicts an example implementation of user selection of digital paint properties for use as part of the mix control.
Figure 6:
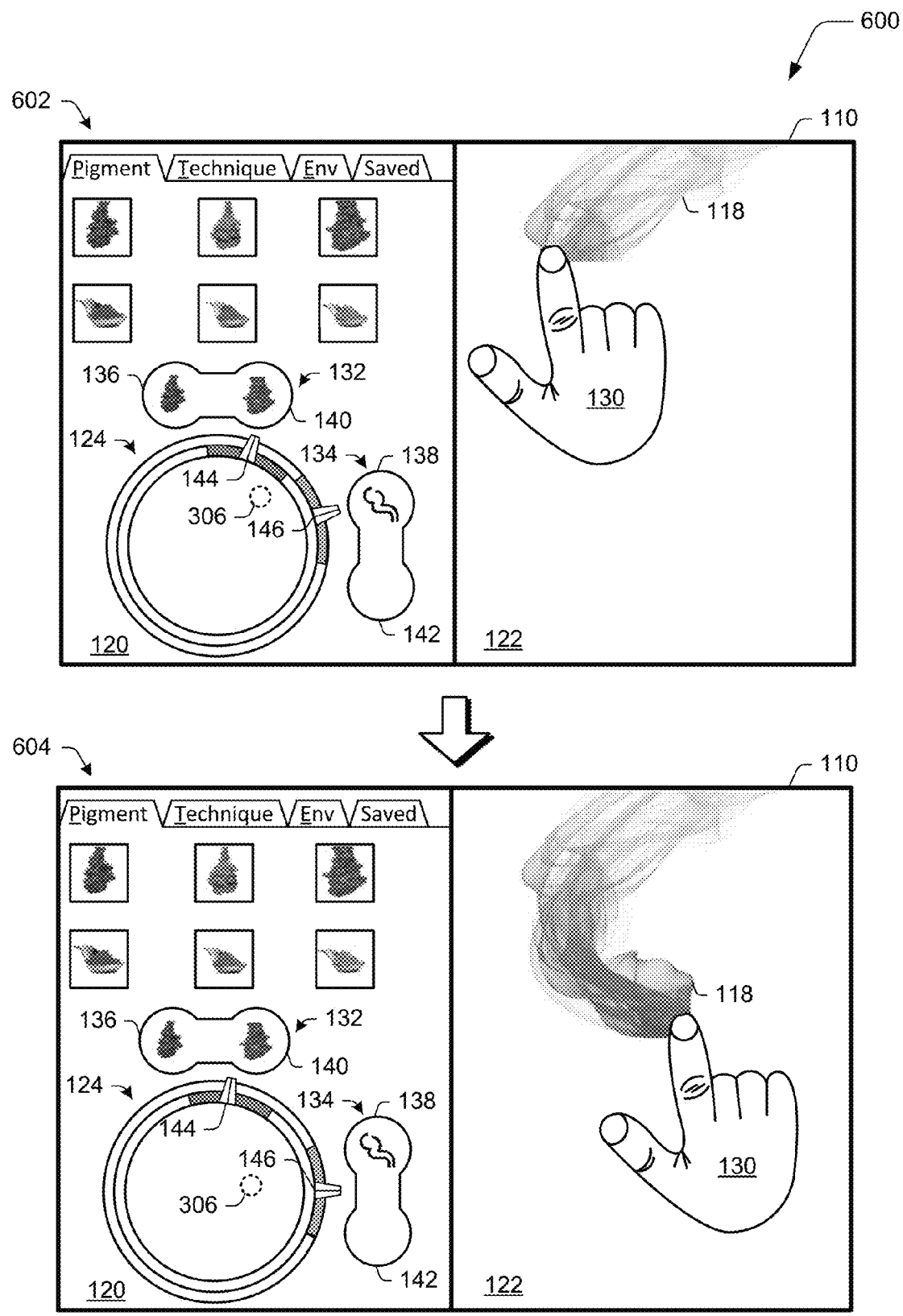
FIGS. 6 and 7 depict example implementations of generation and display of digital paint as feedback in real time caused through interaction with the mix control of FIG. 5.
Figure 7:
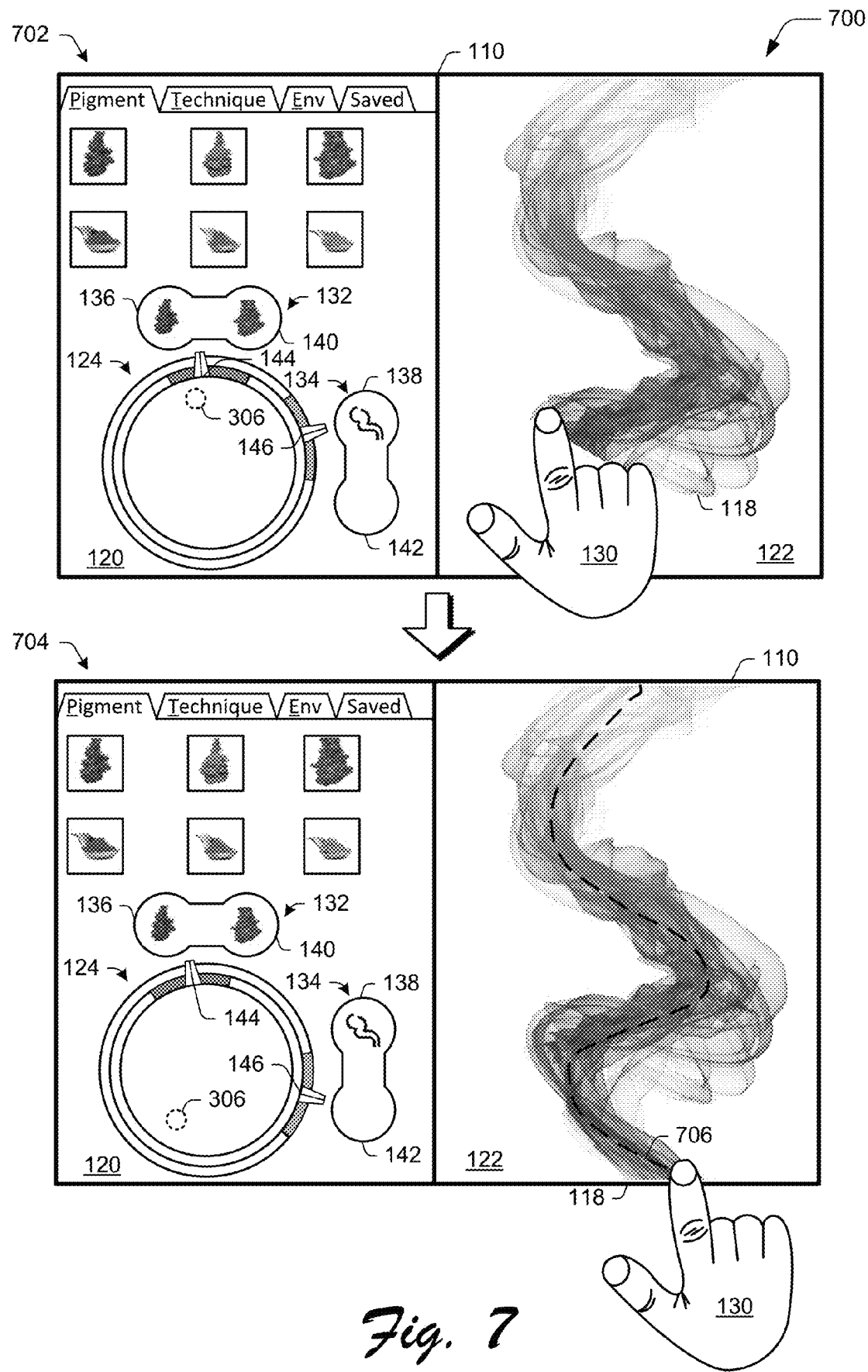
Figure 8:
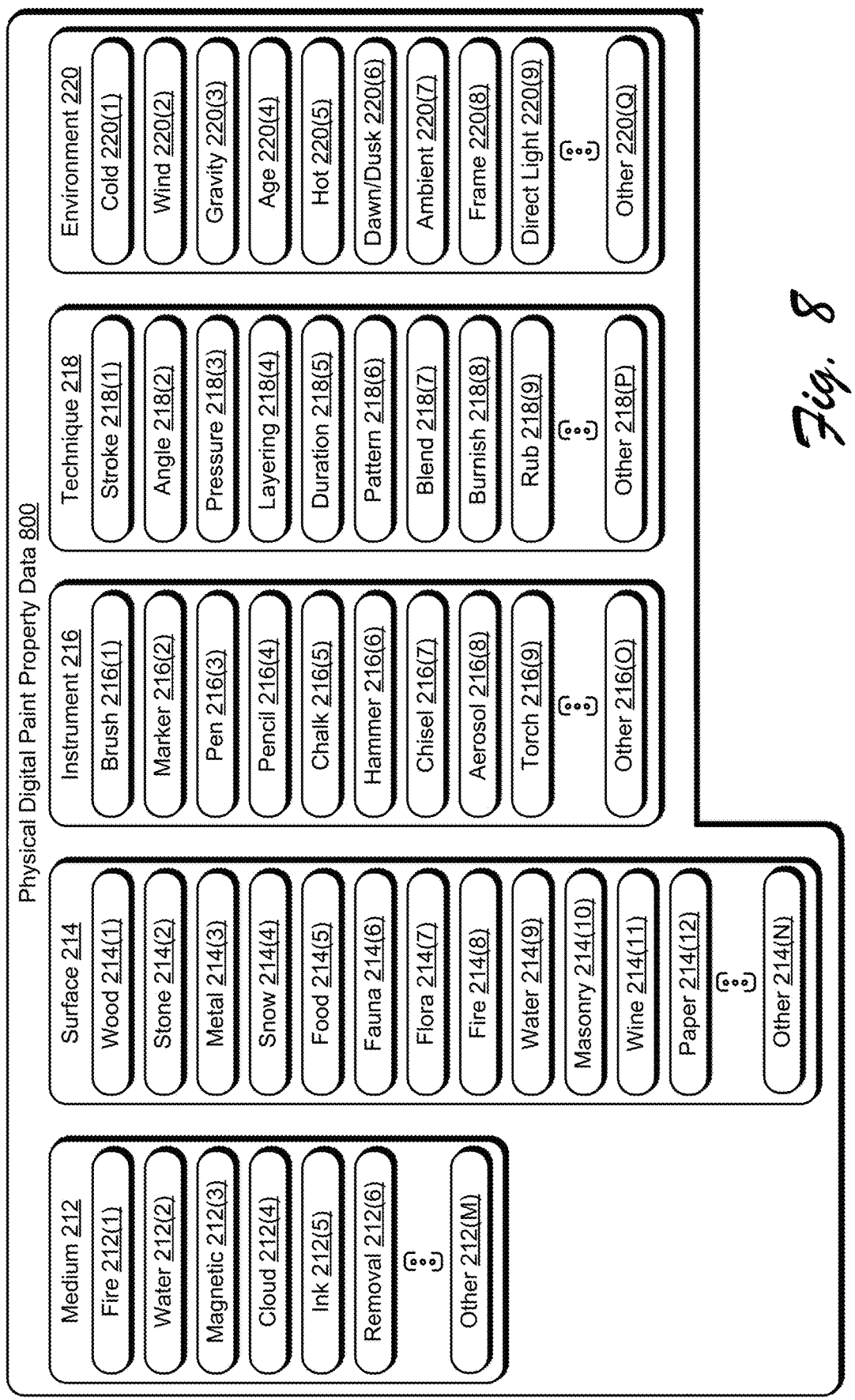
FIG. 8 depicts an example implementation of physical digital paint property data that serves as a basis to determine physical digital paint property interaction.

FIG. 2 depicts an example system 200 showing operation of the digital paint mixing system 116 of FIG. 1 in greater detail. FIG. 3 depicts an example implementation 300 of the paint generation control portion 120 and a mix control of FIG. 2 as a multi-axis control. FIG. 4 depicts an example implementation showing operation of a paint control module of FIG. 2 in greater detail. FIG. 5 depicts an example implementation 500 of user selection of digital paint properties. FIGS. 6 and 7 depict example implementations of generation and display of digital paint as feedback in real time. FIG. 8 depicts examples of physical digital paint properties.

The following discussion describes techniques that may be implemented utilizing the previously described systems and devices. Aspects of each of the procedures may be implemented in hardware, firmware, software, or a combination thereof. In portions of the following discussion, reference is made interchangeably to FIGS. 1-8.

The system 200 of FIG. 2 depicts the digital paint mixing system 116 of FIG. 1 in greater detail. The digital paint mixing system 116 includes a mix control 124 that is configured to specify amounts of digital paint properties 204 to be used to generate digital paint 118. The digital paint properties 204 are illustrated as stored in a storage device 108 of the computing device 102. As previously described, the digital paint properties 204 include color paint properties 206, such as pigments 208. The digital paint properties 204 also include physical paint properties 210, including medium 212, surface 214, instrument 216, technique 218, and environment 220.

A user input device 224 is configured to receive user inputs 222 both to select digital paint properties to be used to generate the digital paint 118 as well as to specify amounts of the selected digital paint properties 204 used to generate the digital paint 118. The digital paint 118 is then output in the user interface 110, e.g., for display on the display device 112 of FIG. 1 as feedback 126. The mix control 124 is configurable in a variety of ways to facilitate this selection and specification, and example of which is described in the following and shown in a corresponding figure.

FIG. 3 depicts a system 300 in an example implementation showing the mix control 124 of FIG. 2 as implemented as a multi-axis control. The mix control 124 is implemented in this example by a mix control module 302 of the paint control module 202. The mix control module 302 uses a first axis 132 and a second axis 134 to define a multi-axis input space 304, which in this instance is defined using X and Y axes or other perpendicular relationship. Other examples are also contemplated, including addition of a Z axis in a virtual or augmented reality implementation.

In this example, a single user input 306 is usable to define a relationship 308 with respect to the first and second axes 132, 134. This relationship 308 may then be used to specify amounts of digital paint properties associated with those axes that are to be used to generate digital paint 118.

First and second digital paint properties 310, 312, for instance, are defined at opposing ends of the first axis 132 that corresponds to an X axis in the multi-axis input space 304. Likewise, third and fourth digital paint properties 314, 316 are defined at opposing ends of the second axis 134.

The single user input 306 thus defines a relationship 308 between the opposing ends of the first axis 132 as well as the opposing ends of the second axis 134. From this, the mix control module 302 determines amounts of associated first, second, third, and fourth digital paint properties 310, 312, 314, 316 to be used to generate digital paint 118. The multi-axis input space 304, for instance, may define a grid, from which, closeness of the single user input 306 to respective first and second axes 132, 134 (e.g., X and Y axes) is determined. Thus, the single user input 306 may be used to define a continuous inverse relationship between the digital paint properties defined at the ends of the first and second axes 132, 134. In other words, greater amounts of a digital paint property at one end of an axis cause lesser amount of a digital paint property at another end of the axis. This user input may continue 306 through continued movement of the user input 306 in the multi-axis input space 304 to make continued changes to these amounts, e.g., through different gradations between opposing ends of the axes.

FIG. 4 depicts a system 400 in an example implementation in which the mix control module 302 and mix control 124 are shown in greater detail as incorporated as part of the paint control module 202 to generate digital paint 118. To begin, the paint control module 202 includes a digital paint property selection module 302 that supports user interaction to select digital paint properties 404 to be used by the mix control 124 of the mix control module 302.

FIG. 5 depicts an example implementation of selection of digital paint properties for use by the mix control 124 by the digital paint property selection module 402 of FIG. 4. This implementation 500 is illustrated using first, second, and third stages 502, 504, 506.

A user selection, for instance, is received of a first digital paint property and a second digital paint property via a user interface, e.g., via a user input device 224. At the first stage 502, a finger of a user's hand 128 is used to select a pigment 162 option from a menu of pigments, i.e., color digital paint properties. The represented pigment 162 is dragged to a first end 136 of a first axis 132 of the mix control 124. Likewise, at the second stage 504, the finger of the user's hand 128 is used to select another pigment 166 option, which is the dragged to a second end 140 of the first axis 132.

At the third stage 506, a menu of medium 156 options is displayed in the user interface 110. From this, a medium option of a physical digital paint property (e.g., smoke 508) is selected for inclusion at a first end 138 of the second axis 134 of the mix control. The second end 142 of the second axis 134 of the mix control 124 is left blank (i.e., open) in this example, which also supports user interaction as further described below. Other examples of selection are also contemplated without departing from the spirit and scope thereof, such as use of a cursor control device, spoken utterance, and so forth.

Thus, the selected digital paint properties 404 are provided from the digital paint property selection module 402 to the mix control module 302. In response, the mix control module 302 associates the first digital paint property (e.g., pigment 162 option) with a first end 136 of the first axis 132 of the mix control 124 and the second digital paint property (e.g., pigment 166 option) with the second end 140 of the first axis 132 of the mix control 124 (block 804).

Likewise, a third digital paint property (e.g., smoke 508) is associated with a first end 138 of the second axis 134 of the mix control 124 and a fourth "null" digital paint property is associated with a second end 142 of the second axis 134. This configures the mix control 124 to implement a multi-axis input space 304 that is usable via a single user input 128. Other examples are also contemplated, such as a single axis or three or more axes input space, e.g., in a virtual reality space.

Referring again to FIG. 2, a user input is received by the mix control module 302 involving user interaction with the mix control 124 via the user interface 110. From this, a relationship is determined by the mix control 124 (e.g., as determined relationship data 406) of the user input to the first and second ends of the axis of the mix control 124 in the user interface 110. The determined relationship data 406 is then provided to a digital paint generation module 408 to generate the digital paint 118 as specified by this data, which is output in the user interface 110.

FIGS. 6 and 7 depict example implementations 600, 700 of user interaction with the mix control 124 and generation of digital paint 118. FIGS. 6 and 7 are depicted using first, second, third, and fourth stages 602, 604, 702, 704 showing sequential user interaction with the control.

At the first stage 602, the first and second ends 136, 138, 140, 142 of the first and second axes 132, 134 of the mix control are configured as described in relation to FIG. 5. The mix control 124 is configured as a multi-axis control having a multi-axis input space implemented using concentric dials. Other examples are also contemplated of implementing a multi-axis input space (e.g., multiple sliders) or a single axis input space, e.g., a single slider.

At the first stage 602, a single user input 306 is received with respect to the first and second axes 132, 134, e.g., via a finger of the user's hand 128 as detected using touchscreen functionality of the display device 112. The user input 306 in this instance is closer to the second end 140 than the first end 136 of the first axis 132. In response, digital paint 118 is generated by the digital paint generation module 408 having more of a pigment 166 option (e.g., blue) associated with the second hand 130 than pigment 162 option (e.g., red) associated with the first end 136. These relative amounts are also illustrated by the indication 144 associated with the mix control 124.

Additionally, the user input 306 is disposed at the closest positioning available to the first end 138 of the second axis 134 and further away from the second end 142. In response, the digital paint 118 is also generated to have a maximum amount of a physical digital paint property associated with the first end 138 of the axis, e.g., smoke 508. Thus, the output of the generated digital paint is based on a mix of color digital paint properties and physical digital paint properties.

At the second stage 602, the single user input 306 is moved a greater amount along the second axis 134 than the first axis 132. In response, a slight color change is noted in the generation of the digital paint 118 to include more of the pigment 162 option associated with the first end 136 than the pigment 166 option associated with the second end 140 of the first axis 132.

Additionally, a larger change is exhibited in the generation of the digital paint 118 to include additional amounts of a null option of the second end 142 of the second axis 134 and thus less of a smoke 508 physical digital paint property. Thus, the null option of the second axis 134 supports definition of amounts of the digital paint property on an opposing side of the axis, solely, without affecting another digital paint property.

At the third stage 702, the user input 306 defines a relationship between the first and second ends 136, 140 of the first axis 132 to further increase amount of the pigment 162 option associated with the first end 136 than the pigment 166 option associated with the second end 140. This causes the digital paint to appear as magenta in this example rather than purely blue as shown in the first and second stages 602, 604. Further, the single user input 306 defines a return to a maximum amount of a digital paint property associated with a first end 138 as opposed to a second end 142 of the second axis 134. This causes the digital paint 118 to exhibit a maximum amount of the smoke 508 physical digital paint property.

At the fourth stage 704 in this example, the user input 306 defines a relationship between the first and second ends 136, 140 of the first axis 132 as a maximum amount of the pigment 162 option associated with the first end 136 and minimum amount of the pigment 166 option associated with the second end 140. This causes the digital paint to appear more red in this example than the magenta color as shown at the third stage 702 and the blue as shown in the first and second stages 602, 604.

Further, the single user input 306 defines a return to a lesser amount of a digital paint property associated with a first end 138 as opposed to a second end 142 of the second axis 134. This causes the digital paint 118 to reduce the amount of the smoke 508 physical digital paint property used to generate the digital paint 118. Thus, the mix control 124 supports a single user input 306 to define a continuous inverse relationship of digital paint properties defined at opposing axes, which may include combination of both color and physical digital paint properties. A result of this is output as feedback to follow a freeform line 706 drawn in the user interface such that a user may readily compare changes to the digital paint properties to each other concurrently over time, e.g., as changes in color, application of physical digital paint properties (e.g., smoke as illustrated), and so forth.

FIG. 8 depicts an example implementation of physical digital paint property data 800 that includes physical digital paint properties including medium 212, surface 214, instrument 216, technique 28, and environment 220. There are a variety of types of mediums 212 that may be mimicked by digital paint 118, both that exist in the real world or are imaginary that expand "outside" of real world interactions. Thus, creation of the digital paint 118 by the digital paint mixing system 116 may be untethered from mimicking the physical world to create digital paint 118 having any characteristic that can be imagined by the user and defined (e.g., mathematically) for rendering by the computing device 102.

Illustrated medium 212 examples include fire 212(1), water 212(2), magnetic 212(3), cloud 212(4), ink 212(5), removal 212(6), and other 212(M) mediums. Thus, the medium 212 describes what material is modeled as being applied to a surface 214.

Likewise, there are a variety of types of surfaces 214 that may be mimicked by digital paint that either mimic real world surfaces or non-existent surfaces that are imagined and interaction with is mathematically modeled as part of the data. Examples of surfaces 214 include wood 214(1), stone 214(2), metal 214(3), snow 214(4), food 214(5), fauna 214(60, flora 214(7), fire 214(8), water 214(9), masonry 214(10), wine 214(11), paper 214(12), and other 214(N)

surfaces. Thus, the surface 214 acts a base of the medium 212, e.g., is a substrate for the medium 212.

An instrument 216 refers to functionality of an instrument being mimicked to apply the medium 212 to the surface 214. Examples of instruments include a brush 216(1), marker 216(2), pen 216(3), pencil 216(4), chalk 216(5), hammer 216(6), chisel 216(7), aerosol 216(8), torch 216(9), and others 216(O). A technique 218 refers to a technique used by the instrument 216 to apply to medium 212 to the surface 214. Examples of techniques 218 include stroke 218(1), angle 218(2), pressure 218(3), layering 218(4), duration 218(5), pattern 218(6), blend 218(7), burnish 218(8), rub 218(9), and others 218(P).

An environment 220 refers to an environment in which the medium 212 is applied to the surface 214, e.g., by the instrument 216 using the technique 218. Examples of environments 220 includes cold 220(1), wind 220(2), gravity 220(3), age 220(4), hot 220(6), dawn/dusk 220(6), ambient 220(7), frame 220(8), direct light 220(9), and other 220(Q) environments. Thus, these variety of physical digital paint properties may describe a variety of physical characteristics modeled as part of generation of the digital paint 220 that include defined interactions between the properties.

The physical digital paint properties may also expand to realize capabilities that are not limited to the physical world, such as meta-conditions including particle gravity, attraction, sparkles, dynamic gradients and repulsion as part of an animation of the digital paint. The physical digital paint properties, for instance, may specify application to a surface to mimic waving of a wand. The digital paint, when "hitting" a substrate, may then sparkle, burst into stars, and so on. Thus, the physical digital paint properties permit user interaction to expand beyond selection of colors as limited by conventional systems to also include how those physical properties define how digital paint having those colors is perceived when rendered in a user interface.

In this way, a user may specify digital paint properties to be used to generate digital paint as well as amounts of the specified digital paint properties through interaction with the digital paint mixing system 116. The digital paint mixing system 116 may also support container representations and hierarchical storage as further described in the following section.

Digital Paint Property Containers and Hierarchical Interaction

Figure 9:
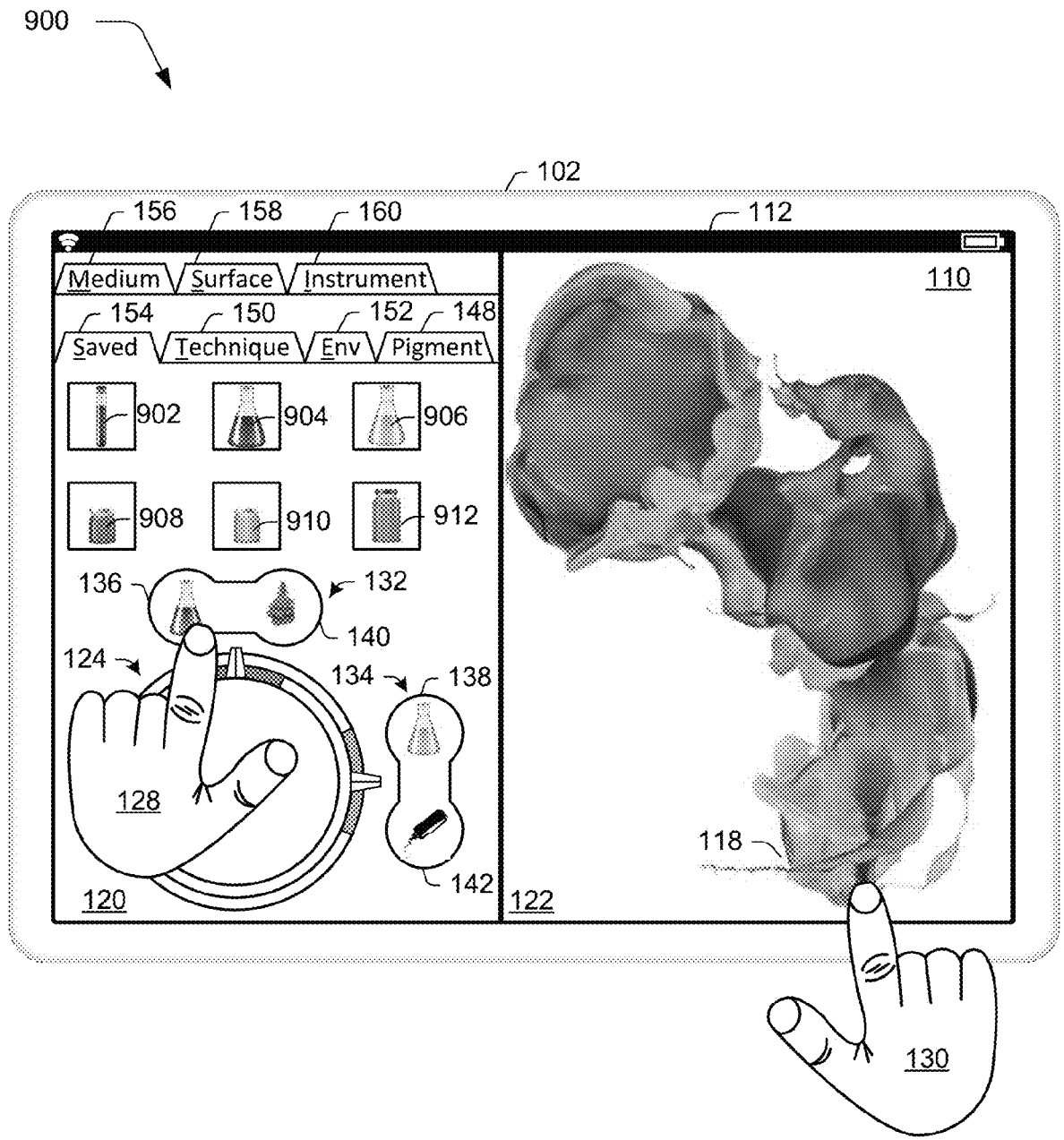
FIG. 9 depicts an example implementation of a mix control in a user interface as supporting selection and use of containers representing saved digital paints for use in generating subsequent digital paint.
Figure 10:
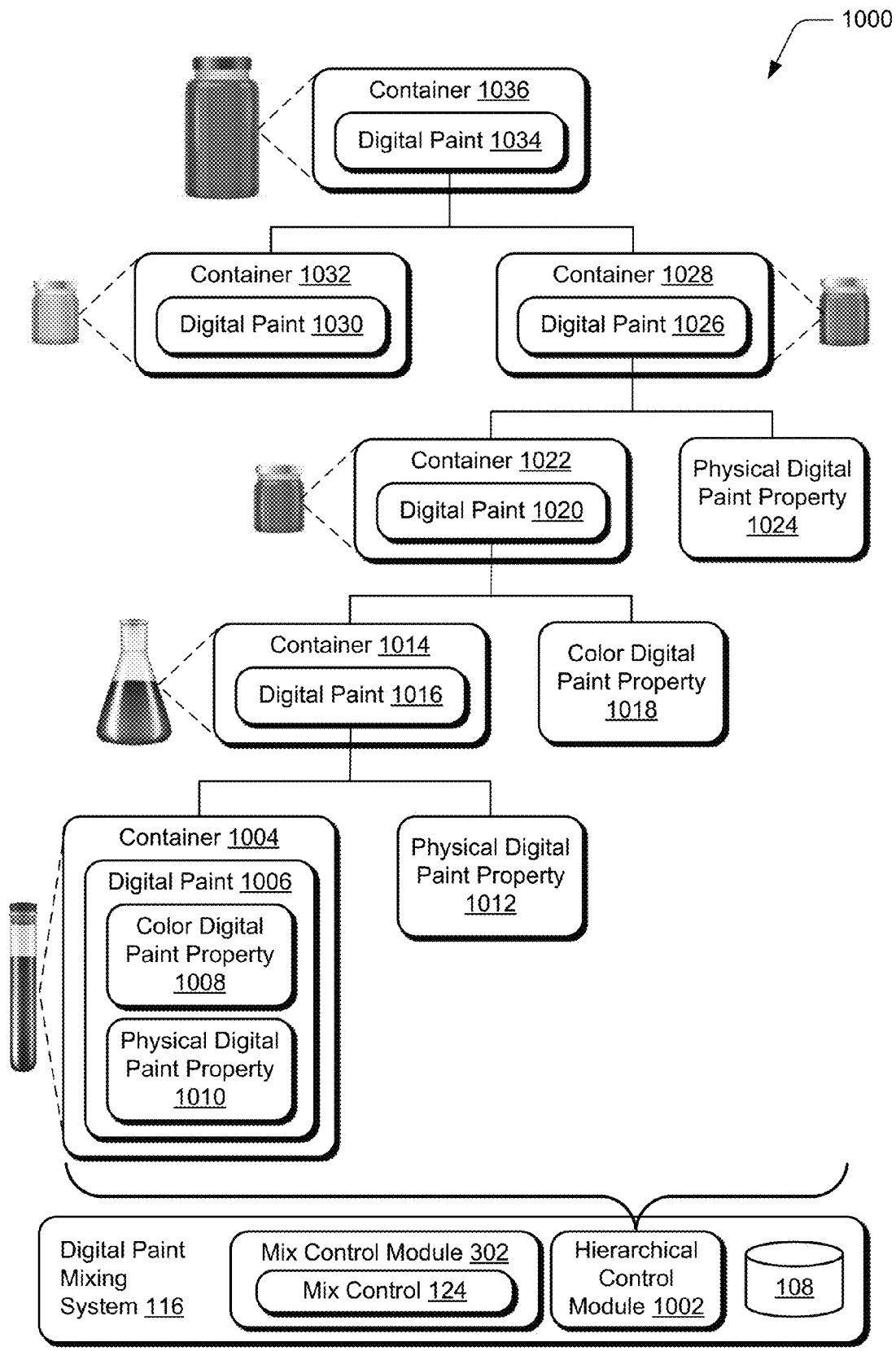
FIG. 10 depicts an example implementation of a hierarchy of containers of saved digital paints.
Figure 11:
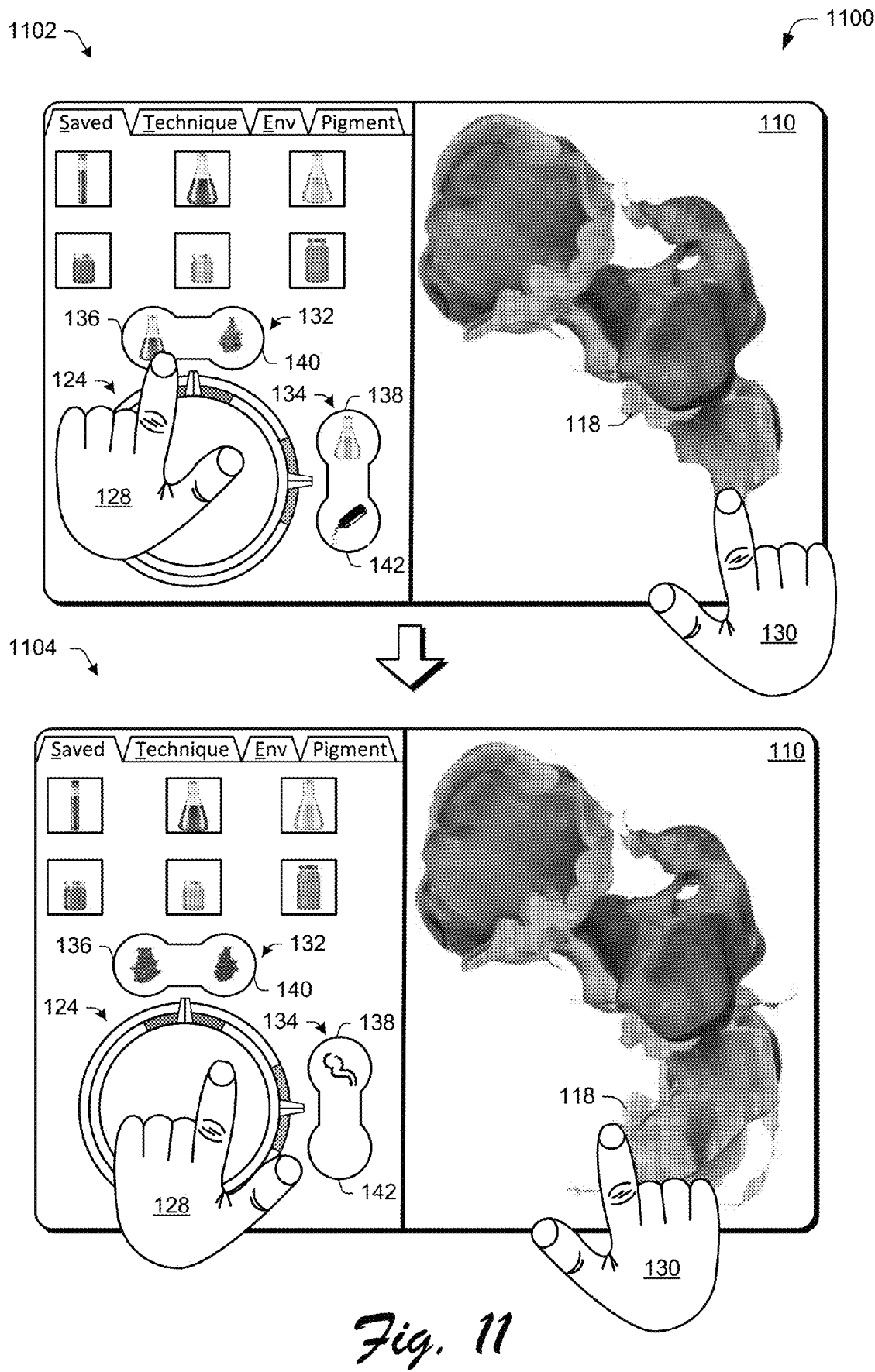
FIG. 11 depicts an example implementation of use of a container representation of a saved digital paint in generation and output of a subsequent digital paint.
Figure 12:
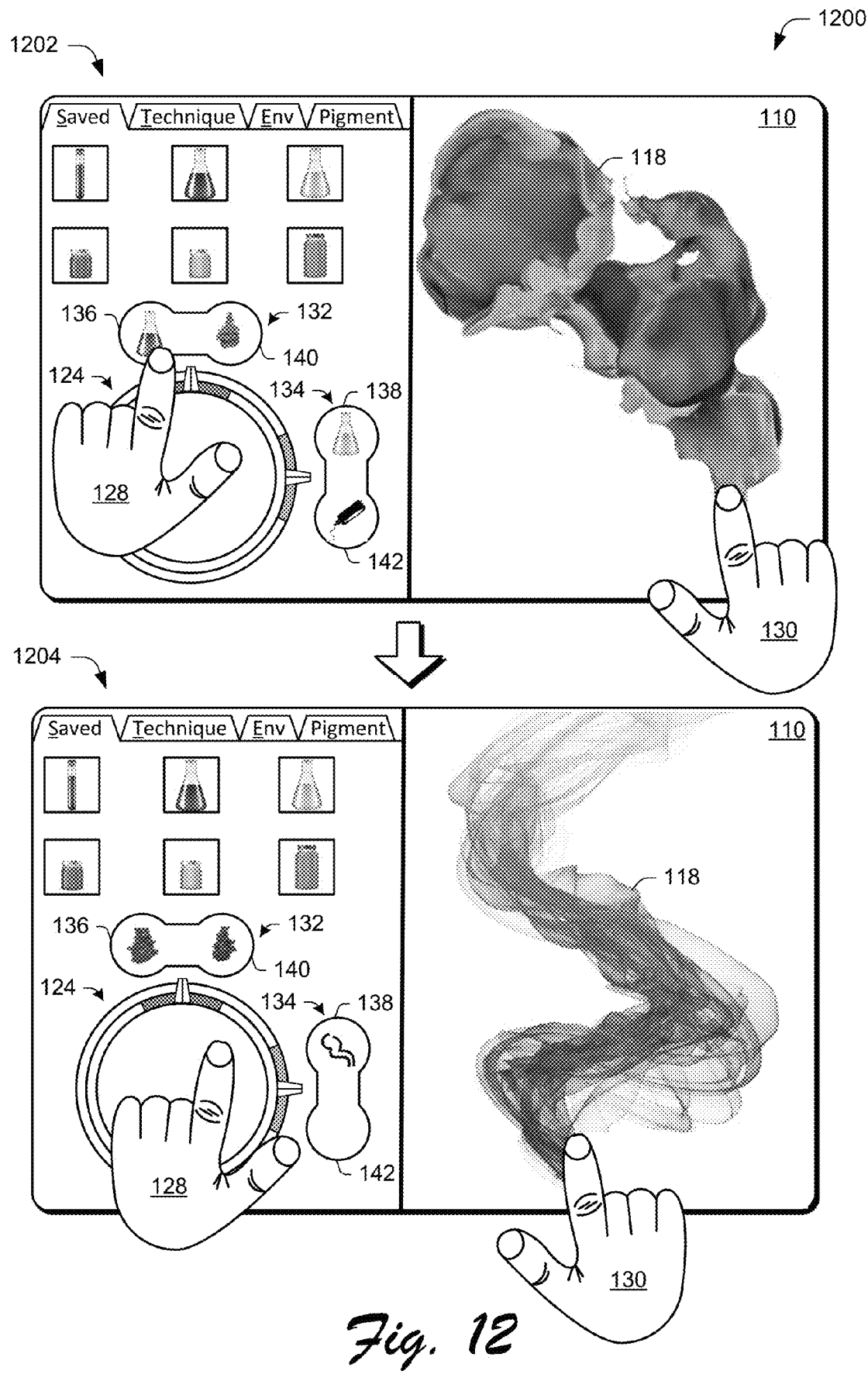
FIG. 12 depicts an example implementation of use of a container representation of a saved digital paint for further modification of the saved digital paint.
Figure 13:
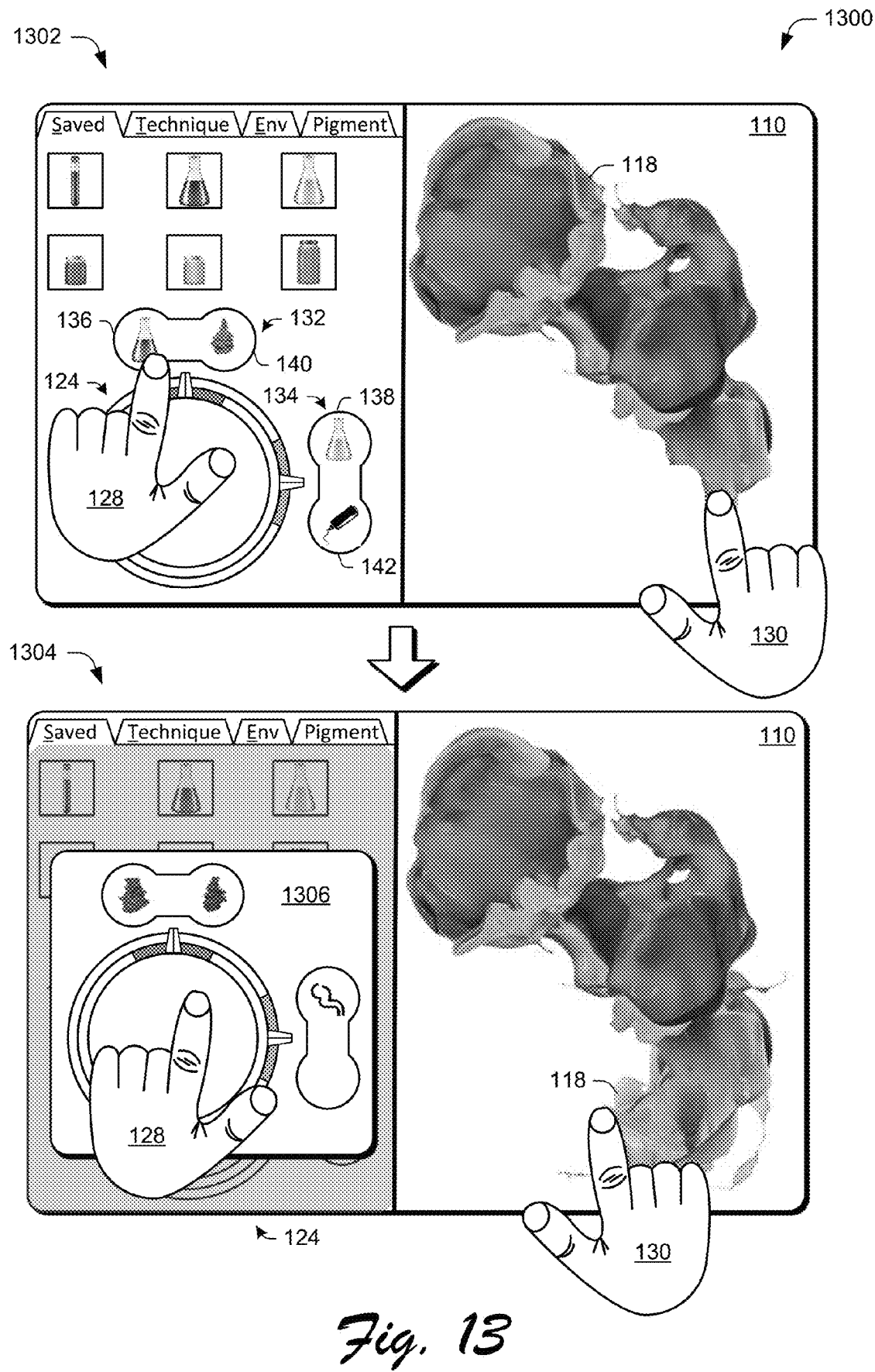
FIG. 13 depicts an example implementation of use of a container representation in which an additional mix control is displayed as an overlay to adjust output of the subsequent digital paint using adjustment of digital paint properties of the saved digital paint.
Figure 14:
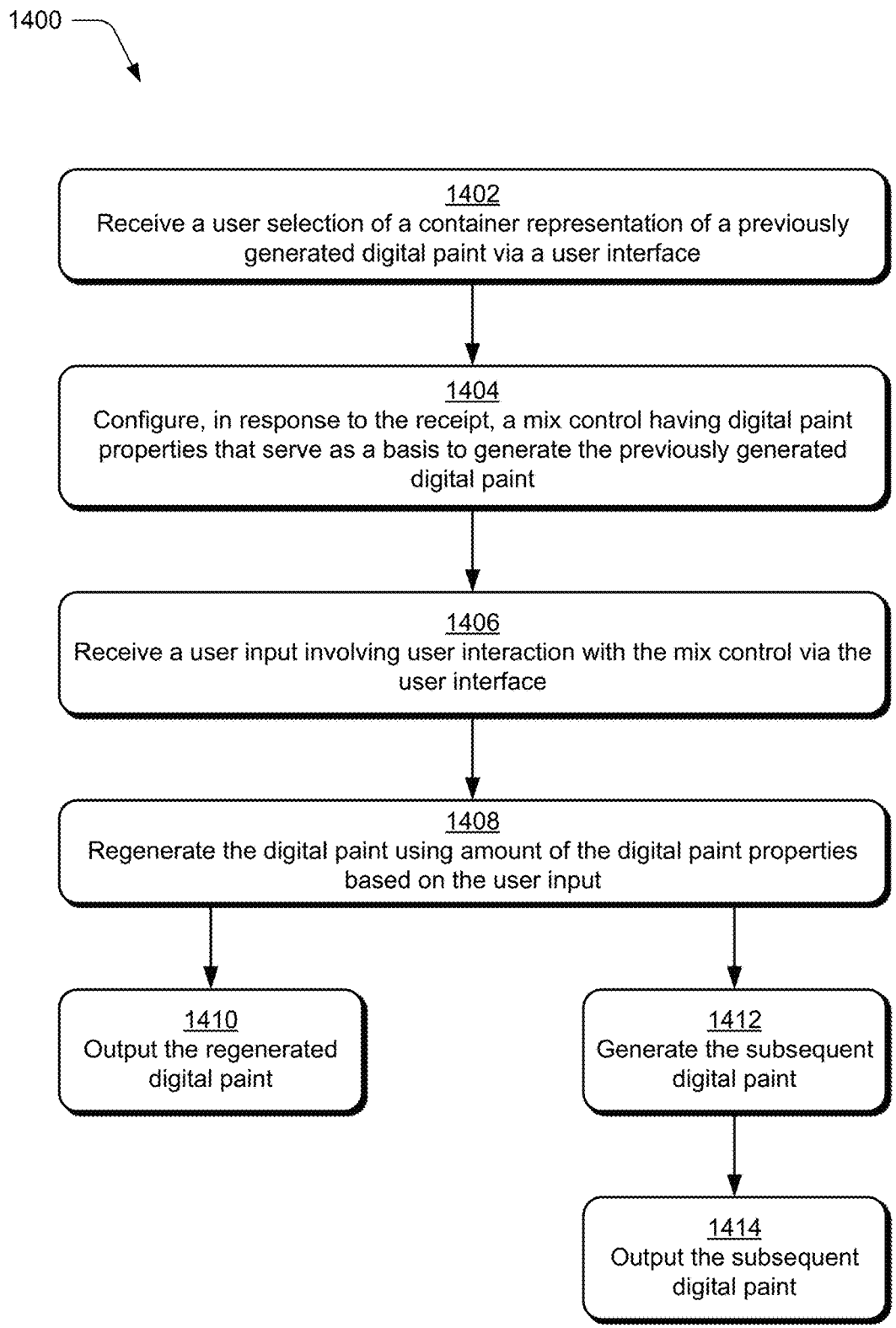
FIG. 14 is a flow diagram depicting a procedure in an example implementation in which digital paint is regenerated based on modification of digital paint properties saved with respect to a container representation of the digital paint.

FIG. 9 depicts an example implementation 900 of a mix control in a user interface as supporting selection and use of container representations of saved digital paints for use in generating subsequent digital paint. FIG. 10 depicts an example implementation of a hierarchy 1000 of container representations of saved digital paints. FIG. 11 depicts an example implementation 1100 of use of a container representation of a saved digital paint in generation and output of a subsequent digital paint. Digital paint properties of the container representation are adjusted in this instance to control real time output of the subsequent digital paint. FIG. 12 depicts an example implementation 1200 of use of a container representation of a saved digital paint for further modification of the saved digital paint. In this instance, the saved digital paint is output and further modified in the user interface as replacing the subsequent digital paint. FIG. 13 depicts an example implementation 1300 of use of a container representation in which an additional mix control is displayed as an overlay to adjust output of the subsequent digital paint using adjustment of digital paint properties of the saved digital paint. FIG. 14 depicts a procedure 1400 in an example implementation in which digital paint is regenerated based on modification of digital paint properties saved with respect to a container representation of the digital paint.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made interchangeably to FIGS. 9-14.

FIG. 9 depicts an example implementation 900 in which a container representation is leveraged as part of digital paint generation. The container representation is used as a basis to store and support interaction of generated digital paints with additional digital paint properties and even other digital paints. A user, for instance, may interact with the mix control 124 as described above to generate digital paint having desired characteristics, e.g., based on color and/or physical digital paint properties. The user may then initiate an input to store to mix control 124, which may be represented in the user interface as a container representation.

In the illustrated example, a saved 154 menu is displayed having a plurality of container representations 902, 904, 906, 908, 910, 912. These container representations 902-912 define color and/or physical digital paint properties used to generate respective digital paints 118. The container representations 902-912 may define digital paint 118 previously generated through user interaction with the mix control 124, predefined digital paints 118 that are "ready-made" and made available by the digital paint mixing system 116, and so forth.

A user input, for instance, may be received through detected user interaction of a first hand 128 of the user to select container representations for inclusion as part of the mix control 124. Illustrated examples of this include container representations disposed at respective first ends 136, 138 of respective ones of the first and second axes 132, 134. The container representations, as part of the mix control 124, then support user interaction in order to generate subsequent digital paint.

The mix control 124, for instance, may be used to specify interactions of additional digital paint properties with digital paint of the container representation to generate subsequent digital paint. This process may continue to support a hierarchical relationship of container representations of digital paints in which digital paints (and associated color and physical digital paint properties) contribute to generate subsequent digital paints. In this way, the container representation may support efficient user interaction with the digital paint mixing system 116 without requiring the user to "start from scratch." Further, the digital paint mixing system 116 provides an output that is configured to help expand a user's understanding of the relationship of these properties and containers, one to another.

As shown in a hierarchy 1000 of FIG. 10, for instance, the digital paint mixing system 116 includes a hierarchical control module 1002. The hierarchical control module 1002 is configured to manage and control a hierarchy 1000 of container representations usable to control generation of digital paint, e.g., as data in a storage device 108. Interaction with the mix control 124 of the mix control module 302 is used as a basis to define a container 1004 representation of digital paint 1006 having a color digital paint property 1008 and a physical digital paint property 1010 in this example.

Interaction with the container 1004 representation, in this instance, as part of the mix control 124 with a physical digital paint property 1012 is then used to define a container 1014 representation by the hierarchical control module 1002 that includes the digital paint properties of the container 1004 representation as well as the physical digital paint property 1012. This process may continue to define additional levels of the hierarchy, such as to generate a container 1014 representation of digital paint 1020 based on the digital paint 1016 of the container 1014 representation along with a color digital paint property 1018, and a container 1028 representation of digital paint 1026 based on the digital paint 1020 of the container 1022 representation and a physical digital paint property 1024.

Use of digital paint properties of different container representations is also supported through interaction with the mix control 124. Digital paint properties of digital paint 1026 of the container 1028 representation, for instance, may be used along with digital paint properties of digital paint 1030 of container 1032 representation to generate digital paint 1034 of container 1036 representation. In this way, the generation of the digital paint 108 may support generation of digital paint throughout the hierarchy 1000.

Additionally, the container representations may be configured to indicate a number of hierarchical levels and/or a number of container representations used to generate respective digital paint of the container representation. In the illustrated example, this is achieved through container representations of successively larger physical containers, e.g., from text tube to flask to small jar to larger jar, to indicate respectively greater numbers. Other examples are also contemplated of representation a location as to where in a hierarchy 1000 a respective container representation is located, a number of containers used (e.g., as a grouped container representation as a corresponding number of jars), and so forth.

Further, the hierarchical control module 1002 may also maintain this hierarchy 1000 and association of container representations with each other in a non-destructive manner In this way, the hierarchical control module 1002 supports changes to a digital paint and associated container representation that are automatically populated to other digital paints and associated container representations that are defined, at least in part, based on that container representation.

In the hierarchy 1000, for instance, a change to amounts of color and digital paint properties 1008, 1010 used to define digital paint 1006 may also be applied automatically and without user intervention by the hierarchical control module 1002 to digital paint 1016 of container 1014 representation, digital paint 1020 of container 1022 representation, digital paint 1026 of container 1028 representation, and digital paint 1034 of container 1036 representation. In this way, user interaction with the mix control 124 may be used to regenerate a corresponding digital paint of a container representation as well as other container representations. This may be performed in a variety of ways, examples of which are shown and described in relation to FIGS. 11-14 in the following discussion.

FIG. 11 depicts an example implementation 1100 in which a container representation included as part of a mix control 124 is selected to change digital paint properties and/or amounts of digital paint properties used to generate the digital paint saved as part of the container representation. This example implementation 1200 is depicted using first and second stages 1102, 1104.

A user selection is received of a container representation of a previously generated digital paint via a user interface (block 1402). At the first stage 1102, for instance, first and second container representations are selected and associated with respective first ends 136, 138 of respective first and second axes 132, 134 of the mix control 124. These container representations are used with other digital paint properties as a basis to generate digital paint 118, e.g., color and physical digital paint properties.

In this example, a user input is received to change digital paint properties used to generate the digital paint associated with the container representation at the first end 136 of the first axis 132. The user input, for instance, may be detected as a double tap of the container representation or other gesture, a right-click of a cursor control device, spoken utterance, and so forth.

In response, the mix control 124 is configured by the mix control module 302 in response to receipt of the user selection to include digital paint properties that serve as a basis to generate the previously generated digital paint (block 1404). As shown at the second stage 1104, the digital paint properties used to generate the digital paint associated with the container representation are populated to the first and second axes 132, 138 of the mix control 124. Thus, the digital paint properties of the digital paint of the container representation replace the previous digital paint properties.

A user input is then received involving user interaction with the mix control 124 via the user interface 110 (block 1406) having the digital paint properties of the digital paint of the container representation. The digital paint of the container representation is regenerated using amounts of the digital paint properties based on the user input (block 1408) as previously described. The regenerated digital paint may then be output (block 1410).

This output may be performed in a variety of ways. In the illustrated example of FIG. 12, the regenerated digital paint of the first container representation is used to adjust generation of the subsequent digital paint, also using the digital paint properties of the first stage 1102 to generate digital paint 118 as feedback in the user interface 110. Thus, in this example, output of the subsequent digital paint continues even through adjustment of digital paint properties of a container representation that serves as a basis for this generation. This results in generation and display of the subsequent digital paint through interaction with digital paint properties defined in a lower level of the hierarchy 1000. In another example, the display of the subsequent digital paint is replaced with a display of the digital paint generated based on the digital paint properties of the container representation, an example of which is described as follows.

FIG. 12 depicts an example implementation 1200 in which output of changes to digital paint associated with a digital container is displayed in the user interface 110 and replaces output of the subsequent digital paint. This implementation 1200 is illustrated using first and second stages 1202, 1204. In the previous example, changes to digital paint associated with a digital container are populated and displayed automatically and without user intervention by the hierarchical control module 1002 "up through" the hierarchy 1000 to other digital paints that leverage the container representation.

In this example the subsequent digital paint is generated based at least in part of the regenerated digital paint (block 1412). The subsequent digital paint is then output in the user interface (block 1414). Thus, an effect of changes to the digital paint associated with the container representation, for instance, is displayed directly in the user interface 110, which may also support output "up through" the hierarchy 1000.

At the first stage 1202, for instance, the container representation associated with the first end 136 of the first axis 132 that is used to generate the digital paint 118 is again selected. At the second stage 1204, this also causes the mix control 124 to be populated with digital paint properties used to generate the digital paint associated with the container representation. However, in this instance the display of the digital paint 118 at the first stage 1202 is replaced with a display of the digital paint 118 associated with the container representation, and not the subsequent digital paint. In other words, the digital paint 118 generated in the user interface 110 corresponds to a current hierarchical level in the hierarchy 1000 of that container representation. In this way, the feedback describes a direct effect of adjustment of the digital paint properties of that container representation for digital paint associated with that representation. Further, this interaction is non-modal in that a user remains within a context of the user interface 110 and mix control 124 to generate the digital paint 118. Other non-modal techniques are also contemplated, an example of which is described as follows and shown in a corresponding figure.

FIG. 13 depicts an example implementation 1300 of use of a container representation in which an additional mix control is displayed as an overlay to adjust output of the subsequent digital paint using adjustment of digital paint properties of the saved digital paint. This implementation 1300 is also illustrated using first and second stages 1302, 1304. At the first stage 1302, a user input is again received via interaction with a mix control 124 to adjust digital paint properties of a contain representation, e.g., which ones used and/or amounts of previously used properties.

In this example, this causes output of an additional mix control 1306, which is displayed as an overlay over the mix control 124 in the user interface 110. Display characteristics in the user interface 110 "outside" of the additional mix control 1406 are changed (e.g., reduced intensity, "grayed out," etc.) to provide focus to this control. User interaction with the additional mix control 1406 is supported to change the digital paint properties associated with digital paint of that container representation as previously described. Output of digital paint 118 is also supported as feedback, which may include the subsequent digital paint "up through" the hierarchy 1100 as illustrated, regenerated changes to the digital paint associated with the container as shown at the second stage 1204 of FIG. 12, and so forth. In this way, container representations may expand functionality to generate digital paints.

Example System and Device

Figure 15:
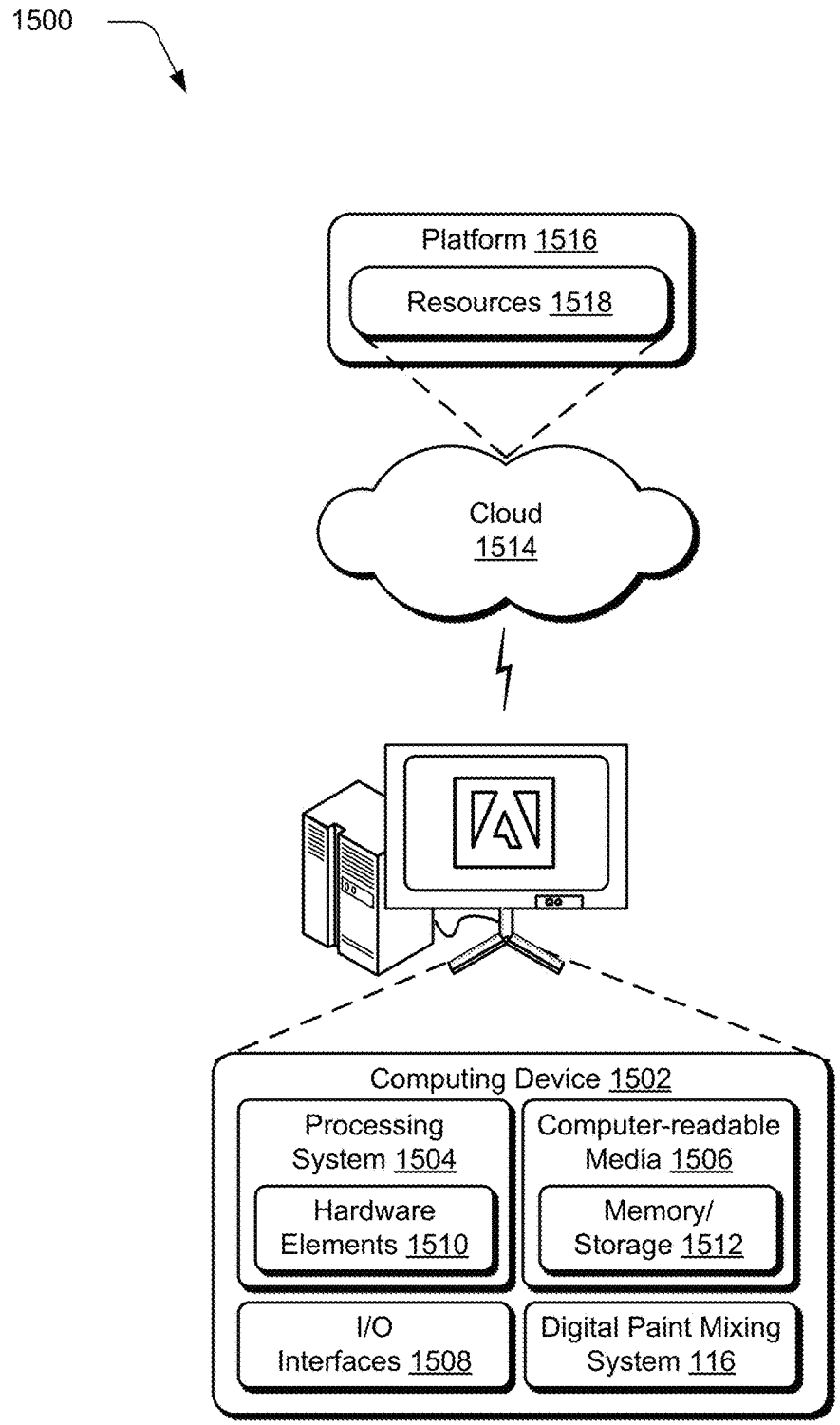
FIG. 15 illustrates an example system including various components of an example device that can be implemented as any type of computing device as described and/or utilize with reference to FIGS. 1-14 to implement embodiments of the techniques described herein.

FIG. 15 illustrates an example system generally at 1500 that includes an example computing device 1502 that is representative of one or more computing systems and/or devices that may implement the various techniques described herein. This is illustrated through inclusion of the digital paint mixing system 115. The computing device 1502 may be, for example, a server of a service provider, a device associated with a client (e.g., a client device), an on-chip system, and/or any other suitable computing device or computing system.

The example computing device 1502 as illustrated includes a processing system 1504, one or more computer-readable media 1506, and one or more I/O interface 1508 that are communicatively coupled, one to another. Although not shown, the computing device 1502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including hardware element 1510 that may be configured as processors, functional blocks, and so forth. This may include implementation in hardware as an application specific integrated circuit or other logic device formed using one or more semiconductors. The hardware elements 1510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1506 is illustrated as including memory/storage 1512. The memory/storage 1512 represents memory/storage capacity associated with one or more computer-readable media. The memory/storage component 1512 may include volatile media (such as random access memory (RAM)) and/or nonvolatile media (such as read only memory (ROM), Flash memory, optical disks, magnetic disks, and so forth). The memory/storage component 1512 may include fixed media (e.g., RAM, ROM, a fixed hard drive, and so on) as well as removable media (e.g., Flash memory, a removable hard drive, an optical disc, and so forth). The computer-readable media 1506 may be configured in a variety of other ways as further described below.

Input/output interface(s) 1508 are representative of functionality to allow a user to enter commands and information to computing device 1502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch from a user's finger or stylus), a camera (e.g., which may employ visible or non-visible wavelengths such as infrared frequencies to recognize movement as gestures that do not involve touch), spatially aware input device (e.g., motion tracking), and so forth. Examples of output devices include a display device (e.g., a monitor or projector), speakers, a printer, a network card, tactile-response device, and so forth. Thus, the computing device 1502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1510 and computer-readable media 1506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1510. The computing device 1502 may be configured to implement particular instructions and/or functions corresponding to the software and/or hardware modules. Accordingly, implementation of a module that is executable by the computing device 1502 as software may be achieved at least partially in hardware, e.g., through use of computer-readable storage media and/or hardware elements 1510 of the processing system 1504. The instructions and/or functions may be executable/operable by one or more articles of manufacture (for example, one or more computing devices 1502 and/or processing systems 1504) to implement techniques, modules, and examples described herein.

The techniques described herein may be supported by various configurations of the computing device 1502 and are not limited to the specific examples of the techniques described herein. This functionality may also be implemented all or in part through use of a distributed system, such as over a "cloud" 1514 via a platform 1516 as described below.

The cloud 1514 includes and/or is representative of a platform 1516 for resources 1518. The platform 1516 abstracts underlying functionality of hardware (e.g., servers) and software resources of the cloud 1514. The resources 1518 may include applications and/or data that can be utilized while computer processing is executed on servers that are remote from the computing device 1502. Resources 1518 can also include services provided over the Internet and/or through a subscriber network, such as a cellular or Wi-Fi network.

The platform 1516 may abstract resources and functions to connect the computing device 1502 with other computing devices. The platform 1516 may also serve to abstract scaling of resources to provide a corresponding level of scale to encountered demand for the resources 1518 that are implemented via the platform 1516. Accordingly, in an interconnected device embodiment, implementation of functionality described herein may be distributed throughout the system 1500. For example, the functionality may be implemented in part on the computing device 1502 as well as via the platform 1516 that abstracts the functionality of the cloud 1514.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital paint generation and hierarchical storage environment, a method implemented by at least one computing device, the method comprising:
    receiving, by the at least one computing device, a user selection of a container representation of a previously generated digital paint via a user interface, the previously generated digital paint generated based on a plurality of digital paint properties;
    populating, by the at least one computing device in response to receiving the user selection, a mix control having a plurality of representations of the plurality of digital paint properties that serve as a basis to generate the previously generated digital paint;
    receiving, by the at least one computing device, a user input involving user interaction with the mix control via the user interface; and
    regenerating, by the at least one computing device, the previously generated digital paint as subsequent digital paint using amounts of the plurality of digital paint properties based on the user input.

2. The method as described in claim 1, wherein the container representation of the previously generated digital paint is displayed as part of the mix control to generate the subsequent digital paint and configuring the mix control causes replacement of at least one digital paint property used to generate the subsequent digital paint with the plurality of digital paint properties used to generate the previously generated digital paint.

3. The method as described in claim 2, further comprising outputting the subsequent digital paint.

4. The method as described in claim 2, wherein the regenerating of the previously generated digital paint causes generating of the subsequent digital paint based on the amounts of the plurality of digital paint properties in real time.

5. The method as described in claim 4, further comprising outputting the generated subsequent digital paint in a user interface.

6. The method as described in claim 5, wherein the outputting of the subsequent digital paint does not include outputting the previously generated digital paint.

7. The method as described in claim 1, wherein the container representation of the previously generated digital paint is displayed as part of another mix control to generate the subsequent digital paint.

8. The method as described in claim 7, further comprising outputting the subsequent digital paint.

9. The method as described in claim 7, wherein the regenerating causes generating and outputting of the subsequent digital paint based on the amounts of the plurality of digital paint properties in real time.

10. The method as described in claim 1, wherein the plurality of digital paint properties include color digital paint properties and physical digital paint properties.

11. The method as described in claim 10, wherein the physical digital paint properties include:
    a medium of the previously generated digital paint;
    a surface on which the previously generated digital paint is applied;
    an instrument used to apply the previously generated digital paint on the surface;
    a technique used by the instrument to apply the previously generated digital paint on the surface; and
    an environment in which the medium of the previously generated digital paint and the surface on which the previously generated digital paint is to be applied are disposed within.

12. In a digital paint generation and hierarchical storage environment, a system comprising:
    a mix control module implemented at least partially in hardware of at least one computing device to implement a mix control including populated representations of a plurality of digital paint properties and usable to specify amounts of the plurality of digital paint properties to be used to generate digital paint based on a user input; and
    a hierarchical control module implemented at least partially in the hardware of the at least one computing device to control a hierarchical arrangement of containers of digital paint having associated digital paint properties as generated through interaction with the mix control, the hierarchical arrangement specifying inclusion of digital paint and associated digital paint properties of a first container as part of a second container with at least one other digital paint property to generate the digital paint based on the user input.

13. The system as described in claim 12, wherein the plurality of digital paint properties include color digital paint properties and physical digital paint properties.

14. The method as described in claim 13, wherein the physical digital paint properties include:
    a medium of the digital paint based on the user input;
    a surface on which the digital paint based on the user input is applied;
    an instrument used to apply the digital paint based on the user input on the surface;
    a technique used by the instrument to apply the digital paint based on the user input on the surface; and
    an environment in which the medium of the digital paint based on the user input and the surface on which the digital paint based on the user input is to be applied are disposed within.

15. In a digital paint generation and hierarchical storage environment, a system comprising:
    means for receiving a user selection of a container representation of a previously generated digital paint via a user interface, the previously generated digital paint generated based on a plurality of digital paint properties;
    means for populating a mix control to include a plurality of representations of the plurality of digital paint properties that serve as a basis to generate the previously generated digital paint;
    means for receiving a user input involving user interaction with the mix control via the user interface; and
    means for regenerating the previously generated digital paint as subsequent digital paint using amounts of the plurality of digital paint properties based on the user input.

16. The system as described in claim 15, wherein the container representation of the previously generated digital paint is displayed as part of the mix control to generate the subsequent digital paint and the configuring means causes replacement of at least one digital paint property used to generate the subsequent digital paint with the plurality of digital paint properties used to generate the previously generated digital paint.

17. The system as described in claim 16, wherein the regenerating means causes generating of the subsequent digital paint based on the amounts of the plurality of digital paint properties in real time in a user interface.

18. The system as described in claim 17, further comprising means for outputting the subsequent digital paint without outputting the previously generated digital paint.

19. The system as described in claim 15, wherein the container representation of the previously generated digital paint is displayed as part of another mix control to generate the subsequent digital paint.

20. The system as described in claim 19, wherein the regenerating means causes generating and outputting of the subsequent digital paint in a user interface based on the amounts of the plurality of digital paint properties.

* * * * *